United States Patent
Dounis

(10) Patent No.: US 11,263,404 B2
(45) Date of Patent: Mar. 1, 2022

(54) CONVERSATIONAL AI PLATFORM USING DECLARATIVE GRAPH MODEL

(71) Applicant: Citrix Systems, Inc., Fort Lauderdale, FL (US)

(72) Inventor: Lampros Dounis, Patras (GR)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 286 days.

(21) Appl. No.: 16/581,929

(22) Filed: Sep. 25, 2019

(65) Prior Publication Data
US 2021/0073338 A1 Mar. 11, 2021

Related U.S. Application Data

(63) Continuation of application No. PCT/GR2019/000062, filed on Sep. 9, 2019.

(51) Int. Cl.
G06F 40/30 (2020.01)
G06N 20/00 (2019.01)
G06F 40/295 (2020.01)

(52) U.S. Cl.
CPC ............ *G06F 40/30* (2020.01); *G06F 40/295* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 2013/0275164 A1 | 10/2013 | Gruber et al. | |
| 2016/0306791 A1* | 10/2016 | Allen | G06F 16/3329 |
| 2018/0096072 A1* | 4/2018 | He | G06F 40/205 |
| 2018/0115643 A1* | 4/2018 | Skiba | H04M 3/5141 |
| 2018/0338041 A1* | 11/2018 | McGann | G10L 15/22 |
| 2019/0166069 A1 | 5/2019 | Yao et al. | |
| 2019/0236205 A1 | 8/2019 | Jia et al. | |
| 2019/0377790 A1* | 12/2019 | Redmond | G06F 40/205 |

OTHER PUBLICATIONS

International Search Report and Written Opinion for Application No. PCT/GB2019/000062 filed Sep. 9, 2019; pp. 14.
Unknown; "Node-RED"; Flow-based programming for the Internet of Things; Aug. 31, 2019; pp. 6; <https://web.archive.org/web/20190831100327/https://nodered.org/>.

* cited by examiner

*Primary Examiner* — Stella L. Woo
(74) *Attorney, Agent, or Firm* — Hoffman Warnick LLC

(57) ABSTRACT

A system, method and program product that provides a conversational AI platform using a declarative graph model. A system is included having a natural language (NL) interface the receives NL user inputs from a message queue; an intent analyzer that determines an intent of a received NL user input and loads a graph associated with the intent; and a graph traversal manager having traversal logic to first traverse the graph first along a start path from an intent node to a dialog node, then traverse an ask path to a question node to obtain missing entity data, then traverse a contacts path to a service node to execute an external service and return a fulfillment response based on submitted entity data, then traverse a replies with path to a response node to create a formatted fulfillment response that is forwarded to the message queue.

24 Claims, 3 Drawing Sheets

CONVERSATIONAL AI PLATFORM USING DECLARATIVE GRAPH MODEL

BACKGROUND OF THE DISCLOSURE

Conversational artificial intelligence (AI) systems allow users to interact with computers in a natural way, using conversation instead of typing, mouse clicks, swiping, etc. Conversational AI systems typically work by using natural language (NL) processing techniques to extract a structure of intent and entities from a user utterance. Using the intent and entities, the platform is able to create dialogs with the user to act as a bridge with external services (e.g., first party services such as an internal mail server or third party services such as a public weather information server, etc.). For example, if a user were to utter "schedule a meeting tomorrow with my development team," the system would discern that the intent is to schedule a meeting with entities described as development team. The platform would for example fulfill the user intent by launching a meeting dialog using a human natural language, contact any necessary external services (e.g., calendar invite, contact lookup, etc.) and abstract any interactions that need to be done in those services (e.g., provide specific time, place, contact details, etc.). The system might respond, e.g., with voice, text or rich attachments that contain information to present to the user as a result of an interaction.

Most conversational AI platforms however use an imperative programming method in which all the implementation details and steps are hardcoded in the software. Changing any of the AI concepts (e.g., dialogs, responses, services, etc.) requires software changes and re-deployment of the software. Imperative programming requires that the developer provide explicit statements for each step of a task that needs to be executed to the system. Accordingly, scaling conversational AI to be able to handle hundreds of different dialogs introduces a significant complexity and maintainability overhead.

BRIEF DESCRIPTION OF THE DISCLOSURE

Aspects of this disclosure provide a conversational AI system, method and program product in which technical complexity is reduced and flexibility is increased by utilizing a graph-based declarative programming model to implement dialogs. Declarative programming is a programming paradigm, i.e., a style of building the structure and elements of computer programs, which expresses the logic of a computation without describing its control flow. Declarative programming describes the desired outcome without detailing the actual steps of accomplishing each task. Task details are instead left to a service performing the execution. The present approach accordingly utilizes graphs to implement unique dialogs, which visually describe the operational and conversational requirements for different user requests (i.e., intents).

In the present approach, when a user inputs a message, the service determines the intent, e.g., "meeting setup," and retrieves and processes an associated graph. The graph can be configured to implement the necessary requirements using nodes and edges to, e.g., perform slot filling to obtain missing information (e.g., date and time), contact an external service (e.g., a calendar service), return a formatted response, suggest another intent (e.g., "prepare for meeting"), etc.

In contrast to declarative programming, prior approaches rely on imperative programming that requires the developer to code algorithms in explicit steps. For example, when implementing an AI dialog for a "Meeting," a prior system would strictly adhere to a process flow that: (1) checks that the user intent is related to the "Meeting" dialog; (2) passes the intent and entities through a series of decision (e.g., if-then-else) statements to see what needs to be done; (3) contacts a "Calendar" external service using a defined external call to get any information related to the specific intent; (4) finds the appropriate response template through a series of decision (e.g., if-then-else) statements; (5) fills the response template with external data or decision data from the above flow; (6) sends a response to the user; and (7) provides a suggestion to the user to prepare before the next meeting. Using a declarative approach, rather than imperative, creating unique dialogs to address user requests can be implemented in a much simpler fashion.

A first aspect of the disclosure provides a conversational artificial intelligence (AI) system that utilizes a graph-based declarative programming model. The system includes a natural language (NL) interface the receives NL user inputs from a message queue and an intent analyzer that determines an intent of a received NL user input and loads a graph associated with the intent. Once loaded, a graph traversal manager having traversal logic is utilized to traverse the graph first along a start path from an intent node to a dialog node, then traverse an ask path to a question node to obtain missing entity data, then traverse a contacts path to a service node to execute an external service and return a fulfillment response based on submitted intent and entity data, then traverse a replies with path to a response node to create a formatted fulfillment response that is forwarded to the message queue.

A second aspect of the disclosure provides a method for implementing a conversational artificial intelligence (AI) system that utilizes a graph-based declarative programming model. Steps of the method include: receiving a natural language (NL) user input from a message queue; determining an intent of a received NL user input and loading a graph associated with the intent; traversing the graph first along a start path from an intent node to a dialog node; traversing the graph from the dialog node along any specified ask paths to question nodes to obtain missing entity data; traversing a contacts path to a service node to execute an external service and return a fulfillment response based on submitted entity data; traversing a replies with path to a response node to create a formatted fulfillment response; and forwarding the formatted fulfillment response to the message queue.

A third aspect of the disclosure provides a computer program product stored on a computer readable storage medium, which when executed by a computing system, implements a conversational artificial intelligence (AI) system that utilizes a graph-based declarative programming model. The computer program product includes: program code for receiving a natural language (NL) user input in a message queue; and program code for determining an intent of a received NL user input and for loading a graph associated with the intent. Also included is program code for traversing the graph first along a start path from an intent node to a dialog node; program code for traversing the graph from the dialog node along any specified ask paths to question nodes to obtain missing entity data; program code for traversing a contacts path to a service node to execute an external service and return a fulfillment response based on submitted entity data; program code for traversing a replies with path to a response node to create a formatted fulfillment response; and program code for forwarding the formatted fulfillment response to the message queue.

A fourth aspect of the disclosure provides a computing system comprising a memory and at least one processor in communication with the memory. The at least one processor is configured to receive a natural language (NL) input from a message queue, determine an intent of a received NL input, and retrieve a graph associated with a determined intent, the graph being a declarative programming model defined by one or more paths and one or more nodes. Based on traversing the one or more paths and one or more nodes of the graph and entity data associated with the received NL input, the at least one processor generates and returns a response to the received NL input.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for implementing a conversational AI system using a graph-based declarative programming model to fulfill user requests, in which graphs can be easily created, deployed and modified, to perform functions for end users. In particular, the present approach implements a platform for handling different requests with graphs that visually express the purpose and requirements of each request. Each graph performs one or more unique functions for an end user, e.g., set up a meeting, look up a contact, send an email, request time off, etc.

Figure 1:
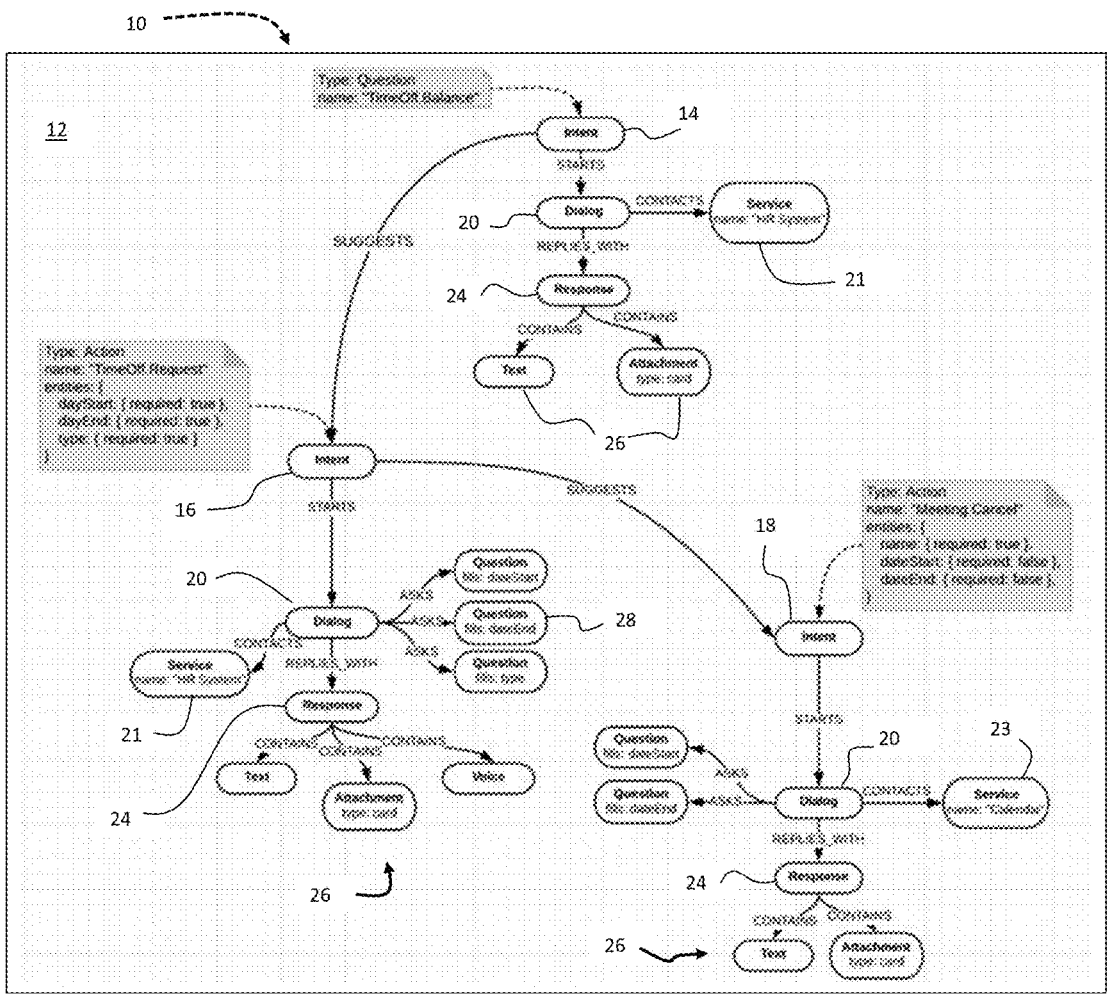
FIG. 1 depicts a graph for implementing a conversational AI dialog, in accordance with an illustrative embodiment.

FIG. 1 depicts an illustrative graph 10, which may for example be created on a graphical user interface (GUI) canvas 12, stored in a database, and executed by an executor service. Any number of such graphs 10 may be deployed in the conversational AI system. In the example shown, the graph 10 is implemented to handle three possible user requests (i.e., "intents"), including a request for a time off balance 14, a request for time off 16, and a request to cancel meeting 18. Graph 10 can be easily created or updated as needed to alter functionality, without reprogramming lines of code.

Each such graph 10 can include: (1) nodes that represent processing elements (e.g., intent nodes, dialog nodes, service nodes, response nodes, etc.); (2) labels that are assigned to one or more nodes (e.g., "TimeOff.Balance", "TimeOff.Request", etc.) to, e.g., describe the nodes, allow nodes to be grouped in sets, etc.; (3) relationships which define the flow between nodes; (4) relationship types, which describes the relationship between nodes (e.g., STARTS, ASKS, CONTACTS, REPLIES_WITH, SUGGESTS, etc.); (5) properties which define information or values that can be used by nodes and/or relationships to perform a given function; and (6) traversal rules that determines how a graph is traversed to service requests. It is understood that the naming conventions used herein for nodes, relationships, etc., are not intended to be limiting, but rather are utilized to facilitate an understanding of the embodiments.

Intent nodes 14, 16, 18 refer to starting point nodes for handling a given request. Intent nodes 14, 16, 18 can have properties specifying the required and optional entities (i.e., informational parameters) needed to fulfill the request. For instance, in the example shown, the time off request intent node 16 requires a start date and end date; and the cancel meeting intent node 18 requires a name, start date and end date. Note that the time off balance intent node 14 does not require any entities to fulfill the request. In addition to connecting with dialog nodes 20, intent nodes can be connected through relationships of type "SUGGESTS" with other intent nodes. For example, the time off balance intent node 14 is connected to the time off request intent node 16, such that when a time off balance is requested by a user, the system can ask whether the user would like to also request time off. Intent nodes 14, 16, 18 can also have properties specifying a phrase that the system could use to trigger a suggestion or action. For example, an inputted phrase "I need help" could trigger a SUGGESTS connection to a customer service intent node.

Dialog nodes 20 oversee and manage the process once an intent node is started. Intent nodes generally connect with dialog nodes 20 on a one-to-one basis through relationships of type "STARTS". Once a dialog node 20 is reached, the dialog node 20 can interface with question nodes 28, contact external fulfiller service nodes 21, 23, interface with response nodes 24, contact other dialog nodes 20, etc.

Question nodes 28 are used to gather unknown entities from the user, using a process referred to as slot filling. For example, if the user states "I would like to schedule some time off," the dialog node 20 may recognize that required entity data is missing and interface with question nodes 28 via an ASK path to ascertain the necessary entity information to fulfill the request. Question nodes 28 can for example include a text property (e.g., "dateStart") that specifies a NL query back to the user, e.g., "When do you want to begin your time off?" Question nodes 28 may also utilize a required response entity format, e.g., "date/time=09/24/20."

Service nodes 22 provide an external fulfillment service and connect with dialog nodes 20 through relationships of type "CONTACTS". For example, a human resource (HR) service node 21 may be used to check on a time off balance for a user, a calendar service node 23 may be contacted to set up or cancel a calendar event for the user, etc. Service nodes 21, 23 have properties that specify the expected fields required by a fulfiller service (e.g., start and end date for a vacation request), and fulfillment response fields (e.g., approved/denied).

Response nodes 24 connect with dialog nodes 20 through relationships of type "REPLIES_WITH" and provide the particular format of the response to the user. In a simple embodiment, the response may simply be a textual output such as "time off approved." In further embodiments, the response node 24 can connect with specific response type nodes 26 through a CONTAINS relationship, such as Text, Attachment, Voice, etc. Thus, for example, a response to the time off balance request may generate a textual output, an attachment such as an email message, and a voice output.

Accordingly, by creating a declarative graph 10 and specifying any required node properties, a conversational request template can be readily deployed without programming lines of code. Each graph 10 can be updated in real time either by a developer, team of experts, or from self-learning machine learning (ML) models. For example, an ML model can be utilized to create SUGGESTS relationships based on user interactions, e.g., based on historical analysis by an ML system, users often send an email to a contact after they perform a lookup on the contact, so an email intent node could be added as a SUGGESTS to a contact lookup intent node. It is understood the described entities, labels and relationships are not intended to be limiting, and others may be utilized.

Figure 2:
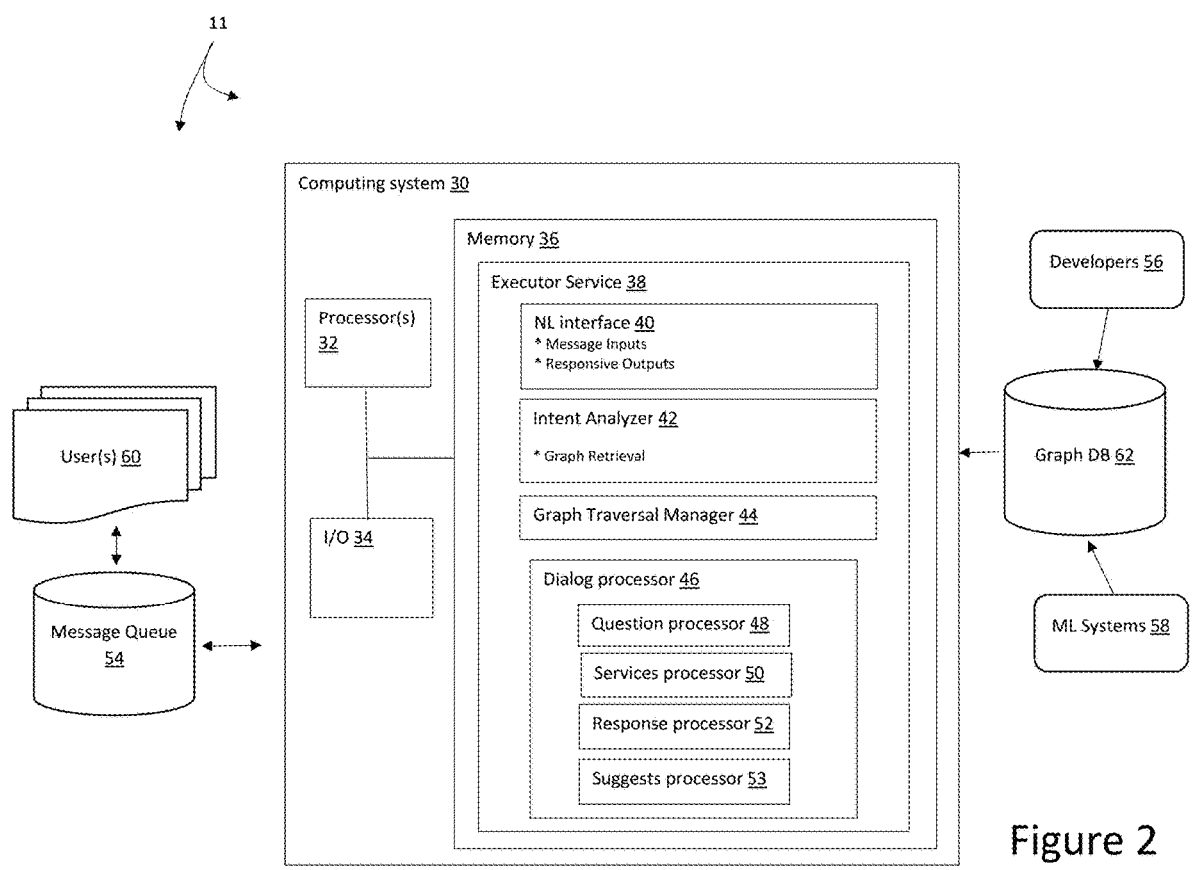
FIG. 2 depicts a computing system for implementing a conversational AI system, in accordance with an illustrative embodiment.

FIG. 2 depicts an illustrative conversational AI system 11 capable of processing declarative graphs using a generalized executor service 38. Conversational AI system 11 generally includes a message queue 54 for handling NL communications with users 60, a computing system 30 having an executor service 38, and a graph database (DB) 62. The graph DB 62 can be populated with unique graphs created by, e.g., developers 56 and ML systems 58 to handle different user requests. When a user 60 submits an input, e.g., "set up a meeting tomorrow with Bob Jones," the input is placed into the message queue 54. Executor service 38 reads the input, e.g., using an NL interface 40 and parses the input using intent analyzer 42 to determine the purpose or intent of the input. Once the intent is determined, an associated graph is retrieved from graph DB 62 and the graph is processed and traversed by a graph traversal manager 44. Graph traversal manager 44 includes logic and rules for traversing nodes, sharing information among nodes based on properties, launching SUGGESTS, etc. Using this approach, the executor service 38 does not require any application or AI logic. Instead, all of the conversational logic is embedded in the stored graphs, and the executor service 38 is only responsible for applying generalized logic to interpret the graphs, parse inputs, and formulate outputs.

Dialog processor 46 is responsible for processing traversed dialog nodes 20, which are largely responsible for formulating fulfillment responses and actions to user inputs. Dialog processor 46 for example determines if a given input includes all of the necessary entity information to formulate a response and/or action based on a properties defined within the intent node. If not all of the entity information can be discerned from an input, a question processor 48 can be triggered to traverse and process question nodes, e.g., using slot filling to obtain all of the necessary information. Once all of the necessary entity information is obtained, a services processor 50 is triggered to traverse and process any service nodes to implement the desired action and return a fulfillment response (e.g., "time off approved"). One a fulfillment response is received, a response processor 52 is triggered to traverse and process a response node, including traversing and processing related response type nodes, to generate a formatted fulfillment response that is forwarded back to the message queue 54, and then outputted to the user 60. A suggests processor 53 may be utilized to process any SUGGESTS paths in the graph 10.

Figure 3:
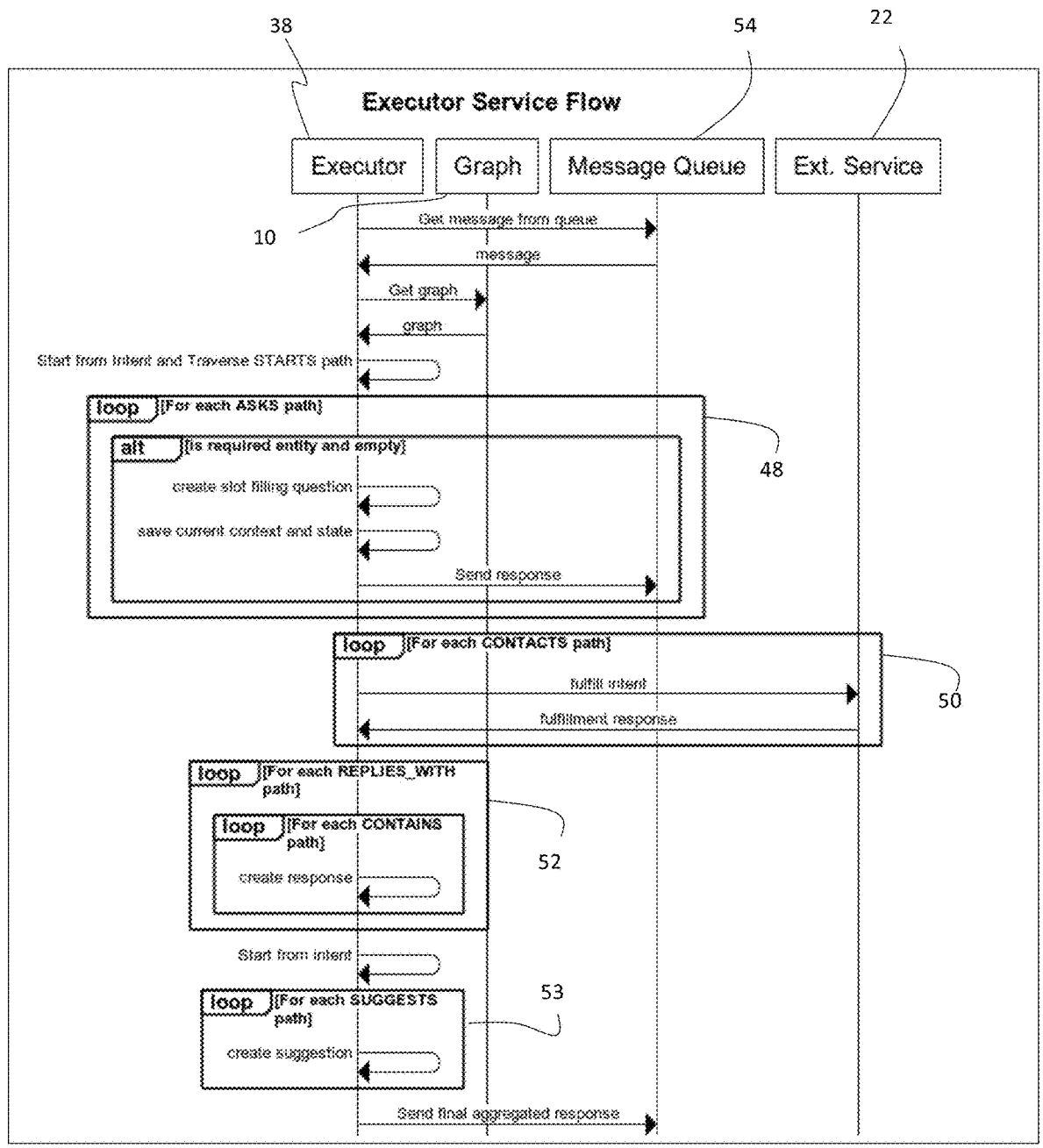
FIG. 3 depicts a swim lane diagram showing a declarative programming model, in accordance with an illustrative embodiment.

FIG. 3 depicts a swim lane diagram showing an executor service 38 flow, in accordance with an illustrative embodiment, with reference to FIGS. 1 and 2. The process begins when the executor service 38 retrieves a message from the message queue 54, determines the intent of the message, and then retrieves an associated graph 10 from the graph DB 62 (FIG. 2). A check may be made to determine if the executor service 38 already has the latest version of the required graph 10, and if so, the executor service 38 need not retrieve the graph 10. Traversal of the graph 10 then begins along the START path (or paths) associated with the intent node to find and process a dialog node (or set of dialog nodes) using the dialog processor 46.

Once the dialog node 20 is reached, any specified ASK paths are traversed to associated question nodes to perform slot filling for any missing entity data. When a question node is reached, the question processor 48 causes queries and response to be sent and received with the user via the message queue 54 to obtain the missing information. Question nodes have a text property specifying what will be output to the user and a property defining which entity will be filled by the user answer. Accordingly, if a current entity of an ask path is required and the entity is empty (not provided by the user or previous interaction), then a slot filling question is generated by the question node, the current NLP (natural language processing) context and state is saved, and the generated response (i.e., question) is sent to the queue.

For example, if the user uttered, "Setup a meeting with Bob Jones," the executor service 38 would extract the intent Meeting.Setup and entity person: Bob Jones. The Meeting.Setup graph would then be pulled and traversed. A slot filling question regarding meeting start date/time would be generated and pushed out to the queue 54. The context and state information would be stored until the user responded with necessary information. In this case, the service 38 needs to store that the requesting user is (1) in a Meeting.Setup state (2) with entities: person: Bob Jones. A Question.StartTime context is also saved for the specific user so that the service 38 knows that this is a follow up question and expects a date/time answer. The question node can generate the slot filling question, "What time do you want to setup the meeting?" and the user might respond with, "today in 1 hour." Using the saved user context, the intent Answer.StartTime can be extracted with entities: time: 29 Aug. 2019 19:10 pm. The current user state can then be restored, e.g., intent: Meeting.Setup and entities: person: Bob Jones, and the new entity can be added to the previous identified entities. The process can continue either with another follow up question as specified by the graph. Saving the state thus allows the service 38 to interact with multiple users and maintain the correct state when the user responds to a question. Saving the NLP context allows better NL decisions and user utterance detection.

In one illustrative embodiment, questions required for slot filling can be generated from a static template based on properties stored in the question node or be generated by a different type of node connected with a relationship to the question node.

Once all of the necessary entity data is ascertained, each CONTACTS path is traversed to execute external services 22 needed to fulfill the user intent. When a service node is reached, the services processor 50 submits entity data to the external service 22 (e.g., date, time and location of a meeting, etc.), and a fulfillment response is returned. The process repeats for each CONTACTS path. In the case where multiple external services 22 are needed, queries can be done in any order or manner, e.g., parallel, asynchronously, etc.

Once each CONTACTS path has been traversed, the executor service 38 may traverse each REPLIES_WITH path to determine the appropriate response format for the fulfillment response using response processor 52. The responses might be connected with one or more response types, e.g., text, attachment and/or voice. The executor service 38 may traverse the CONTAINS path to find the appropriate response types and materialize them into a formatted fulfillment response.

Next, the executor service 38 may traverse all the SUGGESTS paths (if any) in order to create suggestion responses using suggests processor 53. Finally, the executor service 38 generates a final aggregated response, which is outputted to the message queue 54.

Conversational AI system 11 (FIG. 2) may for example be implemented by a cloud computing environment that employs a network of remote, hosted servers to manage, store and/or process data, and may generally be referred to, or fall under the umbrella of, a "network service." The cloud computing environment may include a network of interconnected nodes, and provide a number of services, for example hosting deployment of customer-provided software, hosting deployment of provider-supported software, and/or providing infrastructure. In general, cloud computing environments are typically owned and operated by a third-party organization providing cloud services (e.g., Amazon Web Services, Microsoft Azure, etc.), while on-premises computing environments are typically owned and operated by the organization that is using the computing environment. Cloud computing environments may have a variety of deployment types. For example, a cloud computing environment may be a public cloud where the cloud infrastructure is made available to the general public or particular sub-group. Alternatively, a cloud computing environment may be a private cloud where the cloud infrastructure is operated solely for a single customer or organization or for a limited community of organizations having shared concerns (e.g., security and/or compliance limitations, policy, and/or mission). A cloud computing environment may also be implemented as a combination of two or more cloud environments, at least one being a private cloud environment and at least one being a public cloud environment. Further, the various cloud computing environment deployment types may be combined with one or more on-premises computing environments in a hybrid configuration.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Executor service 38 and related components may be implemented with any type of computing system 30 that for example includes at least one processor 32, memory 36, an input/output (I/O) 34, e.g., one or more I/O interfaces and/or devices, and a communications pathway or bus. In general, the processor(s) 32 execute program code which is at least partially fixed in memory 36. While executing program code, the processor(s) 32 can process data, which can result in reading and/or writing transformed data from/to memory 36 and/or I/O 34 for further processing. The pathway provides a communications link between each of the components in the computing device. I/O 34 can comprise one or more human I/O devices, which enable a user 60 to interact with the computing system 30 and the computing system may also be implemented in a distributed manner such that different components reside in different physical locations.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system, comprising:
a natural language (NL) interface that receives NL user inputs from a message queue;
an intent analyzer that determines an intent of a received NL user input and loads a graph associated with the intent from a set of graphs, wherein each of the graphs is created using a common declarative model that includes predefined types of nodes having configurable properties for implementing different types of requests, wherein each graph includes:
an intent node configurable to specify entity data required to fulfill a request, at least one question node configurable to collect entity data from a user, a service node configurable to fulfill the request with a specified external service, and a response node configurable to specify a response format; and
a graph traversal manager having traversal logic to traverse the graph from the intent node along an ask path to the at least one question node to obtain missing entity data, then traverse a contacts path to the service node to execute the specified external service and return a fulfillment response based on submitted entity data, then traverse a replies with path to the response node to create a formatted response that is forwarded to the message queue.

2. The system of claim 1, wherein the graph traversal manager further traverses a contains path from the response node to a response type node to obtain a specific format for the formatted response.

3. The system of claim 2, wherein the specific format includes at least one of a text message, an attachment, and a voice message.

4. The system of claim 1, wherein the graph traversal manager further traverses a suggests path to another intent node.

5. The system of claim 1, wherein a set of required entity data is specified by the intent node.

6. The system of claim 1, wherein the graph is stored in graph database along with a set of graphs that each associate with a unique intent.

7. The system of claim 1, wherein a machine learning system automatically modifies or creates graphs.

8. A method for implementing a conversational artificial intelligence (AI) system that utilizes a graph-based declarative programming model, comprising:
receiving a natural language (NL) input from a message queue;
determining an intent of a received NL input and retrieving a graph associated with the intent from a set of graphs, wherein each of the graphs is created using a common declarative model that includes predefined types of nodes having configurable properties for implementing different types of requests, wherein each graph includes:
an intent node configurable to specify entity data required to fulfill a request, at least one question node configurable to collect entity data from a user, a service node configurable to fulfill the request with a specified external service, and a response node configurable to specify a response format;
traversing the graph first along a start path from an intent node to a dialog node;
traversing the graph from the dialog node along any specified ask paths to question nodes to obtain missing entity data;
traversing a contacts path to the service node to execute the specified external service and return a fulfillment response based on submitted entity data;
traversing a replies with path to the response node to create a formatted response; and
forwarding the formatted response to the message queue.

9. The method of claim 8, further including traversing a contains path from the response node to a response type node to obtain a specific format for the formatted response.

10. The method of claim 9, wherein the specific format includes at least one of a text message, an attachment, and a voice message.

11. The method of claim 8, further comprising traversing a suggests path to another intent node.

12. The method of claim 8, wherein a set of required entity data is specified by the intent node.

13. The method of claim 8, wherein the graph is stored in graph database along with a set of graphs that each associate with a unique intent.

14. The method of claim 8, wherein a machine learning system automatically modifies or creates graphs.

15. A computer program product stored on a computer readable storage medium, which when executed by a computing system, implements a conversational artificial intelligence (AI) system that utilizes a graph-based declarative programming model, wherein the computer program product comprises:
program code for receiving a natural language (NL) input from a message queue;
program code for determining an intent of a received NL input and for retrieving a graph associated with the intent from a set of graphs, wherein each of the graphs is created using a common declarative model that includes predefined types of nodes having configurable properties for implementing different types of requests, wherein each graph includes:
an intent node configurable to specify entity data required to fulfill a request, at least one question node configurable to collect entity data from a user, a service node configurable to fulfill the request with a specified external service, and a response node configurable to specify a response format;
program code for traversing the graph to at least one question node to obtain missing entity data;
program code for traversing a contacts path to the service node to execute the external service and return a fulfillment response based on submitted entity data;
program code for traversing a replies with path to the response node to create a formatted response; and
program code for forwarding the fulfillment response to the message queue.

16. The program product of claim 15, further including program code for traversing a contains path from the response node to a response type node to obtain a specific format for the formatted response.

17. The program product of claim 16, wherein the specific format includes at least one of a text message, an attachment, and a voice message.

18. The program product of claim 15, further comprising program code that traverses a suggests path to another intent node.

19. The program product of claim 15, wherein a set of required entity data is specified by the intent node.

20. The program product of claim 15, wherein the graph is stored in graph database along with a set of graphs that each associate with a unique intent.

21. A computing system comprising:
a memory; and
at least one processor in communication with the memory, the at least one processor configured to:
   receive a natural language (NL) input from a message queue,
   determine an intent of a received NL input,
   retrieve a graph associated with a determined intent, the graph being one of a plurality of graphs created with a declarative programming model defined by one or more paths and one or more nodes wherein each of the nodes has configurable properties for implementing different types of requests, and
   based on traversing the one or more paths and one or more nodes of the graph and entity data associated with the received NL input, generate and return a response to the received NL input.

22. The computing system of claim 21, wherein the declarative programming model includes at least one question node to obtain missing entity data.

23. The computing system of claim 21, wherein the declarative programming model includes at least one service node to execute an external service and return a fulfillment response based on submitted entity data.

24. The computing system of claim 21, wherein the declarative programming model includes at least one response node to create a fulfillment response.

* * * * *